(12) United States Patent
Ishikawa

(10) Patent No.: US 8,776,638 B2
(45) Date of Patent: Jul. 15, 2014

(54) WAVE GEAR DEVICE HAVING THREE-DIMENSIONALLY CONTACTABLE SHIFTED TOOTH PROFILE

(75) Inventor: Shoichi Ishikawa, Yokohama (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 654 days.

(21) Appl. No.: 13/131,924

(22) PCT Filed: Dec. 18, 2008

(86) PCT No.: PCT/JP2008/003848
§ 371 (c)(1),
(2), (4) Date: May 31, 2011

(87) PCT Pub. No.: WO2010/070712
PCT Pub. Date: Jun. 24, 2010

(65) Prior Publication Data
US 2011/0237382 A1    Sep. 29, 2011

(51) Int. Cl.
*F16H 33/00* (2006.01)
(52) U.S. Cl.
USPC .......................................................... 74/640
(58) Field of Classification Search
USPC .................................. 74/640, 461, 457, 462
See application file for complete search history.

(56) References Cited

U.S. PATENT DOCUMENTS 2,906,143 A  *  9/1959  Walton ............................. 74/640
4,823,638 A     4/1989  Ishikawa (Continued)

FOREIGN PATENT DOCUMENTS

JP     45-041171       12/1970
JP     63-115943 A      5/1988

(Continued)

OTHER PUBLICATIONS

International Search Report (PCT/ISA/210) for PCT/JP2008/003848 dated Feb. 24, 2009.

*Primary Examiner* — Troy Chambers
*Assistant Examiner* — Zakaria Elahmadi
(74) *Attorney, Agent, or Firm* — Buchanan Ingersoll & Rooney PC

(57) ABSTRACT

Disclosed is a wave gear device (1) for setting the flexible state of the principal section (30) of a flexible external gear in a normal-deflection state (at a deflection coefficient κ=1). The moving locus of a tooth profile in the principal section (30) is determined by a rack approximation, and a similar curve (BC), which is obtained by similarly transforming a curve (AB) cut from that moving locus, is used to define the fundamental addendum shape of the tooth profile in the principal section. The portion of the tooth profile of the flexible external gear other than the principal section is shifted so that both each negative-deflection side moving locus (M3), which is obtained in each plane of rotation to deflect in a negative deflection state (at the deflection coefficient κ<1) closer to the diaphragm side than the principal section and each positive-deflection side moving locus (M2), which is obtained in each plane of rotation to deflect in a positive deflection state (at the deflection coefficient κ>1) closer to the front end opening side than the principal section, may become curves (M3a and M2a) to contact at the bottom (a point (P)) of a normal-deflection moving locus (M1). The partial meshing engagement can also be held at the section other than the principal section in the tooth trace direction, so that the load torque performance of the wave gear device can be advantageously improved.

2 Claims, 10 Drawing Sheets

(56) References Cited

U.S. PATENT DOCUMENTS

| | | | |
|---|---|---|---|
| 4,974,470 A | 12/1990 | Ishikawa et al. | |
| 5,269,202 A * | 12/1993 | Kiyosawa et al. | 74/640 |
| 5,687,620 A | 11/1997 | Ishikawa | |
| 5,782,143 A * | 7/1998 | Ishikawa | 74/640 |
| 5,918,508 A | 7/1999 | Ishikawa | |
| 6,082,222 A * | 7/2000 | Kiyosawa et al. | 74/640 |
| 6,167,783 B1 | 1/2001 | Ishikawa | |
| 6,202,509 B1 * | 3/2001 | Dold | 74/640 |
| 6,220,115 B1 * | 4/2001 | Hirn et al. | 74/640 |
| 6,477,918 B2 * | 11/2002 | Sakamoto | 74/640 |
| 6,526,849 B1 | 3/2003 | Ishikawa | |
| 7,117,759 B2 * | 10/2006 | Ishikawa | 74/461 |
| 7,249,536 B2 * | 7/2007 | Kiyosawa et al. | 74/640 |
| 7,328,632 B2 * | 2/2008 | Ishikawa | 74/640 |
| 7,694,607 B2 * | 4/2010 | Ishikawa et al. | 74/640 |
| 7,735,396 B2 * | 6/2010 | Ishikawa et al. | 74/640 |
| 7,748,118 B2 * | 7/2010 | Kobayashi et al. | 29/893.34 |
| 8,011,273 B2 * | 9/2011 | Kobayashi | 74/640 |
| 2002/0174742 A1 * | 11/2002 | Kobayashi | 74/640 |
| 2005/0044986 A1 * | 3/2005 | Ishikawa | 74/640 |

FOREIGN PATENT DOCUMENTS

| | | |
|---|---|---|
| JP | 64-079448 A | 3/1989 |
| JP | 64-083972 A | 3/1989 |
| JP | 07-293643 A | 11/1995 |
| JP | 09-166186 A | 6/1997 |
| JP | 11-159584 A | 6/1999 |
| JP | 2001-146945 A | 5/2001 |

\* cited by examiner (a)

(b)

WAVE GEAR DEVICE HAVING THREE-DIMENSIONALLY CONTACTABLE SHIFTED TOOTH PROFILE

TECHNICAL FIELD

The present invention relates to the improvement of a tooth profile of a rigid internally toothed gear and a flexible externally toothed gear in a wave gear device. More specifically, the present invention relates to a shape of a tooth whereby the gears of the wave gear device can maintain a meshing engagement over a wide range in a principal section (plane of rotation) set at a predetermined position in a tooth trace direction, while a partial meshing engagement can also be held in another plane of rotation in the tooth trace direction.

BACKGROUND ART

Since the invention (Patent Document 1) of the originator C. W. Musser, various inventions of wave gear devices have been proposed up to the present by many researchers, beginning with Musser himself and including the present inventors. There are also various inventions relating merely to the tooth profiles of these devices. For example, in Patent Document 2, the present inventors propose that the fundamental shape be an involute tooth profile, and in Patent Documents 3 and 4, the present inventors propose a tooth profile design method for guiding the addendum shapes of both gears which make wide-area contact using a technique of approximating the meshing engagement of the teeth of a rigid internally toothed gear and a flexible externally toothed gear with a rack.

[Patent Document 1] U.S. Pat. No. 2906143
[Patent Document 2] JP 45-41171B
[Patent Document 3] JP 63-115943A
[Patent Document 4] JP 64-79448A Commonly, a wave gear device has a circular rigid internally toothed gear, a flexible externally toothed gear disposed coaxially inside the internally toothed gear, and a wave generator fitted inside the externally toothed gear. The flexible externally toothed gear includes a flexible cylindrical barrel, a diaphragm extending in the radial direction from the rear end of this cylindrical barrel, and external teeth formed in the external peripheral surface portion close to the front end opening of the cylindrical barrel. The flexible externally toothed gear is made to deflect in an ellipsoidal shape by the wave generator, and the externally toothed gear meshes with the rigid internally toothed gear in the ends of the major axis of the ellipse.

When the flexible externally toothed gear has deflected into an ellipsoidal shape, the amount of deflection in the external teeth increases along the tooth trace direction from the side close to the diaphragm toward the front end opening, substantially in proportion to the distance from the diaphragm. As the wave generator rotates, each portion of the toothed part of the flexible externally toothed gear repeatedly deflects in the radial direction.

The degree to which methods for setting a reasonable tooth profile account for such deflecting action (coning) of the flexible externally toothed gear caused by the wave generator has been insufficient. There is at present a strong commercial demand for improvement in the load torque performance of wave gear devices. To achieve this requires a reasonable tooth profile which enables a continuous meshing engagement that accounts for tooth coning across the entire tooth trace.

DISCLOSURE OF THE INVENTION

Problems the Invention Is Intended to Solve

It is an object of the present invention to provide a wave gear device which makes it possible for the gears of the wave gear device to maintain a meshing engagement over a wide range in a principal section (plane of rotation) set at a predetermined position in the tooth trace direction, and to hold a partial meshing engagement in another plane of rotation in the tooth trace direction, while accounting for coning of the flexible externally toothed gear.

Means for Solving the Problems

To achieve the object described above, the wave gear device of the present invention comprises:

a circular rigid internally toothed gear, a flexible externally toothed gear disposed coaxially inside the internally toothed gear, and a wave generator fitted inside the externally toothed gear; the wave gear device characterized in that:

the flexible externally toothed gear has a flexible cylindrical barrel, a diaphragm extending in a radial direction from a rear end of the cylindrical barrel, and external teeth formed in an external peripheral surface portion at a side of a front end opening of the cylindrical barrel;

the flexible externally toothed gear is deflected into an ellipsoidal shape by the wave generator and meshed with the rigid internally toothed gear at both ends of the ellipse in a major axis direction;

the amount of deflection in the external teeth of the flexible externally toothed gear deflected into an ellipsoidal shape increases from a side near the diaphragm toward the side of the front end opening along the tooth trace direction, the increase being substantially in proportion to a distance from the diaphragm;

a plane of rotation at a desired position in the tooth trace direction of the flexible externally toothed gear is established as a principal section and both the rigid internally toothed gear and the flexible externally toothed gear in the principal section are spur gears having a module m;

the number of teeth of the flexible externally toothed gear is set to be fewer than the number of teeth of the rigid internally toothed gear by 2n (n being a positive integer);

in a major axis position in an ellipsoidal rim neutral line of the flexible externally toothed gear in the principal section, an amount of deflection $2\kappa nm$ (where $\kappa$ is the deflection coefficient) relative to a rim neutral circle before deflection is set so as to deflect in a normal-deflection state of 2 mm ($\kappa=1$);

in a tooth profile of the flexible externally toothed gear, the tooth profile portions to either side of the principal section in the tooth trace direction are shifted;

the meshing engagement of the flexible externally toothed gear and the rigid internally toothed gear is approximated with a rack meshing engagement, and each of the moving loci of the teeth of the flexible externally toothed gear relative to the teeth of the rigid internally toothed gear accompanying rotation of the wave generator is determined in a plane of rotation at each of the positions including the principal section in the tooth trace direction of the flexible externally toothed gear;

in a normal-deflection moving locus obtained in the principal section, a curve portion running from point A at a peak to a next point B at a bottom is scaled down $\lambda$ times ($\lambda<1$) using point B as a similarity center to obtain a first similar curve BC, and the first similar curve BC is used as a fundamental shape of an addendum of the rigid internally toothed gear;

a curve obtained by rotating the first similar curve BC 180 degrees about an endpoint C of the first similar curve BC is scaled down $(1-\lambda)/\lambda$ times using the endpoint C as a similarity center to obtain a second similar curve, and the second similar curve is used as a fundamental shape of an addendum of the flexible externally toothed gear; and the shifted amount in the tooth trace direction in the tooth profile of the flexible externally toothed gear is set so that curves tangent at the bottom of the normal-deflection moving locus in the principal section are inscribed both by each of the negative-deflection side moving loci obtained in each of the planes of rotation to deflect in a negative deflection state (deflection coefficient: $\kappa<1$) closer to the diaphragm side than the principal section, and each of the positive-deflection side moving loci obtained in each of the planes of rotation to deflect in a positive deflection state (deflection coefficient: $\kappa>1$) closer to the front end opening side than the principal section.

When a denotes a distance in the tooth trace direction from the position of the principal section in the external teeth to a front end of the external teeth at the front end opening side;

b denotes a distance in the tooth trace direction from the position of the principal section in the external teeth to a rear end of the external teeth at the diaphragm side; and c denotes a distance from the rear end of the external teeth to the diaphragm, the deflection coefficient K of each of the planes of rotation to deflect in the positive deflection state in the external teeth is defined by the following formula, where a distance from the principal section is in the position of s:

$$\kappa=(s+b+c)/(b+c)$$

The deflection coefficient $\kappa$ of each of the planes of rotation to deflect in the negative deflection state in the external teeth is defined by the following formula:

$$\kappa=(-s+b+c)/(b+c)$$

In this case, the shifted amount in the external teeth is hmn, where h can be defined by the following formula.

$$h=\kappa-1$$

Effects of the Invention

In the wave gear device of the present invention, the flexible externally toothed gear is shifted in the tooth trace direction while taking into account the coning thereof, and the moving locus of the teeth of the flexible externally toothed gear in the principal section relative to the teeth of the rigid internally toothed gear is designed so as to share a bottom with the moving locus of other sections, thereby achieving a reasonable meshing engagement through the entire tooth trace in addition to the regular wide-range meshing engagement in the principal section.

Therefore, according to the present invention, it is possible to achieve a continuous meshing engagement of the teeth of the gears through a wide range in the principal section, and at the same time, an effective meshing engagement can also be achieved in the range from the principal section to the opening side and to the diaphragm side along the tooth trace direction. Consequently, greater torque can be transmitted in comparison with a conventional wave gear device in which meshing takes place in a smaller range along the tooth trace direction.

BEST MODE FOR CARRYING OUT THE INVENTION

A wave gear device in which the present invention is applied is described hereinbelow with reference to the drawings.

(Configuration of Wave Gear Device)

Figure 1:
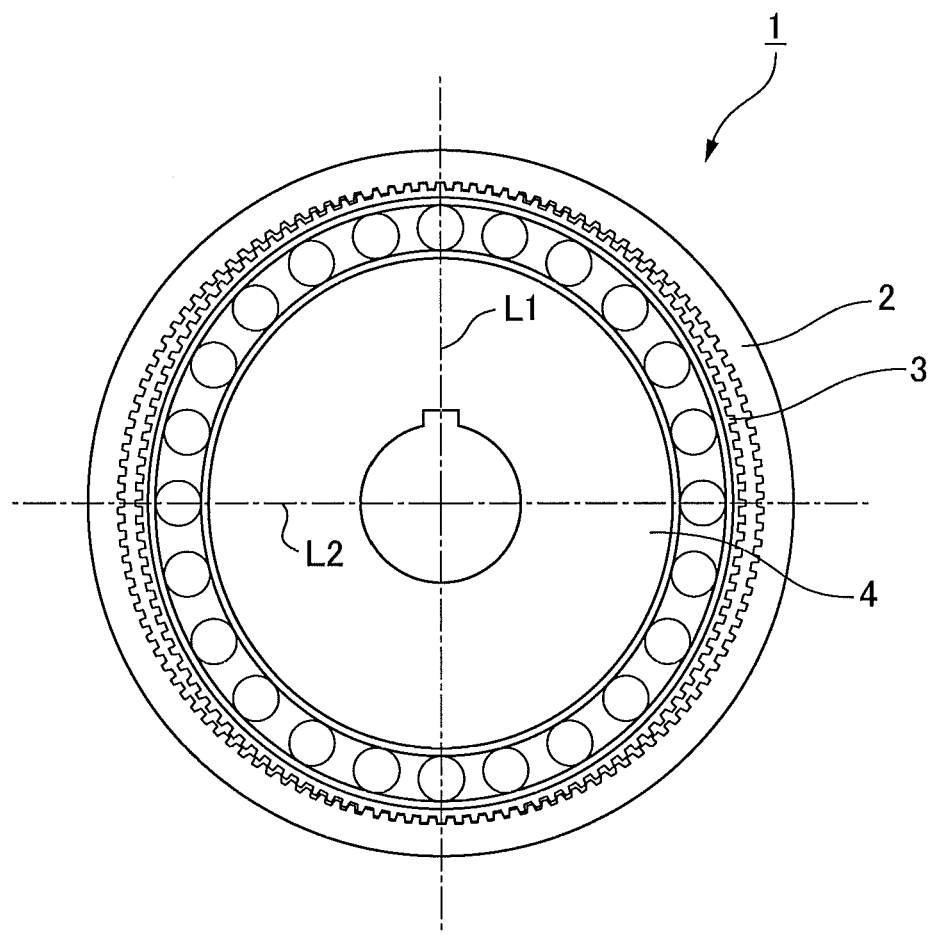
FIG. 1 is a schematic front view of a common wave gear device.
Figure 2:
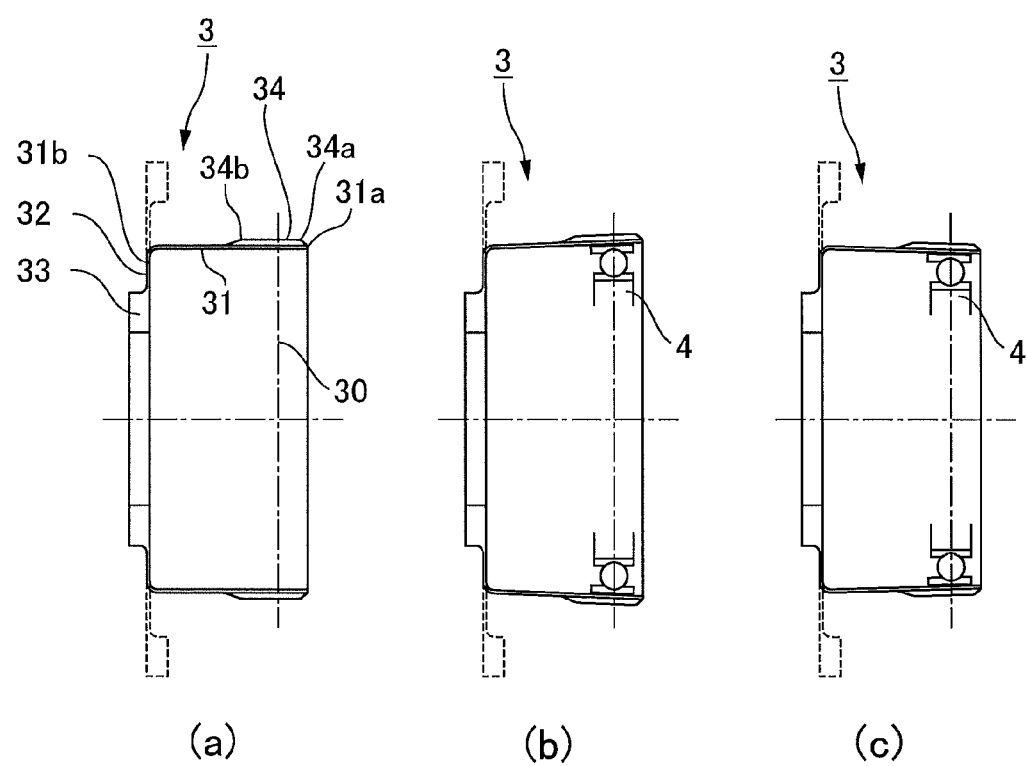
FIG. 2 is a descriptive diagram that shows deflection states of the flexible externally toothed gear, where (a) shows a state before deflection, (b) shows a cross section including the major axis of the flexible externally toothed gear deformed into an ellipsoidal shape, and (c) shows a cross section including the minor axis of the flexible externally toothed gear deformed into an ellipsoidal shape.

FIG. 1 is a front view of a wave gear device as an object of the present invention, and FIGS. 2(a) through (c) are cross-sectional views showing cross sections, including axes, of a state in which the opening of the flexible externally toothed gear has been deflected into an ellipsoidal shape, wherein FIG. 2(a) shows a state before deformation, FIG. 2(b) shows a cross section including the major axis of the ellipse after deformation, and FIG. 2(c) shows a cross section including the minor axis of the ellipse after deformation. In FIGS. 2(a) through (c), the solid lines show the cup-shaped flexible externally toothed gear, and the dashed lines show a silk-hat shaped flexible externally toothed gear.

As shown in these drawings, a wave gear device 1 has a circular rigid internally toothed gear 2, a flexible externally toothed gear 3 disposed inside the internally toothed gear, and a wave generator 4 having an ellipsoidal outline and fitted into the externally toothed gear. The difference in the number of teeth between the rigid internally toothed gear 2 and the flexible externally toothed gear 3 is 2n (n being a positive integer), and the flexible externally toothed gear 3 of the wave gear device 1 is made to deflect into an ellipsoidal shape by the ellipsoidally contoured wave generator 4 and is meshed with the rigid internally toothed gear 2 at both ends of the ellipsoidal shape in the major axis L1 direction. When the wave generator 4 is rotated, the position of the meshing engagement between the gears 2, 3 moves in the circumferential direction, resulting in relative rotation between the gears 2, 3 corresponding to the difference in the number of teeth between the gears. The flexible externally toothed gear 3 includes a flexible cylindrical barrel 31, a diaphragm 32 continuing from the rear end 31b of the barrel and extending in the radial direction, a boss 33 continuing from the diaphragm 32, and external teeth 34 formed in the external peripheral surface portion at the side of the open end 31a of the cylindrical barrel 31.

The ellipsoidally contoured wave generator 4, which is fitted into the internal peripheral surface of the portion of the cylindrical barrel 31 where the external teeth are formed, causes the amount of deflection in the cylindrical barrel 31 to gradually increase either radially outward or radially inward from the rear end 31b at the side of the diaphragm toward the open end 31a. The amount of outward deflection gradually increases in proportion to the distance from the rear end 31b to the open end 31a in a cross section including the major axis L1 of the ellipsis as shown in FIG. 2(b), and the amount of inward deflection gradually increases in proportion to the distance from the rear end 31b to the open end 31a in a cross section including the minor axis L2 of the ellipse as shown in FIG. 2(c).

Therefore, the amount of deflection in the external teeth 34 formed in the external peripheral surface portion close to the open end 31a also gradually increases from external teeth rear end part 34b in the tooth trace direction toward the external teeth front end part 34a close to the opening, in proportion to the distance from the open end 31a.

Figure 3:
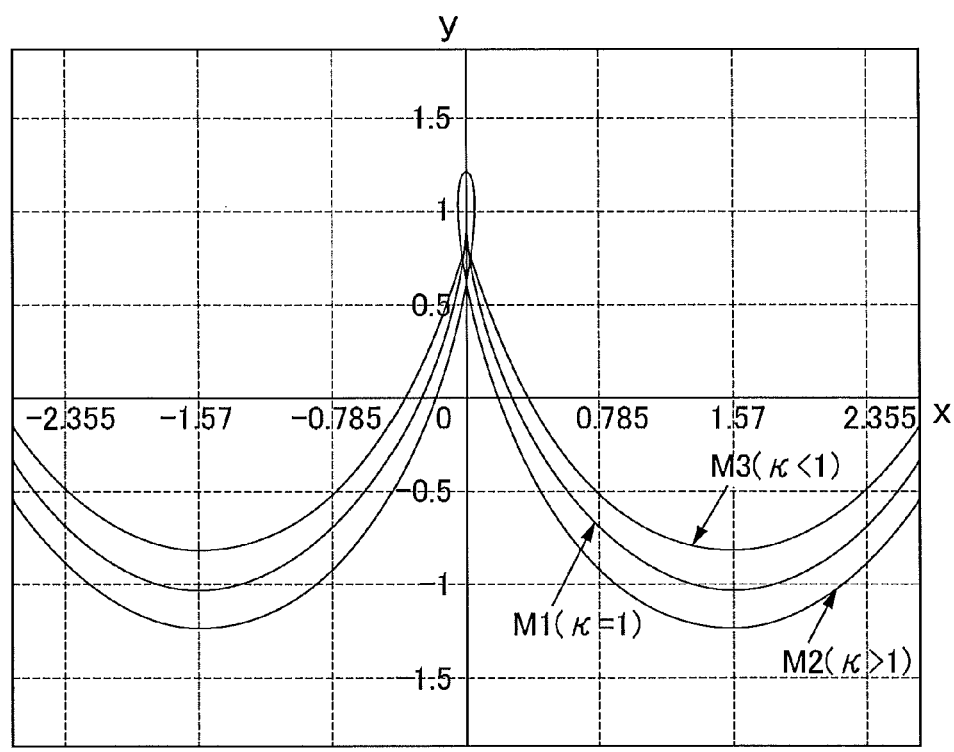
FIG. 3 is a descriptive diagram that shows the moving locus obtained when the relative movement of the gears in an arbitrary plane of rotation in the tooth trace direction of the tooth profile is approximated with a rack.

FIG. 3 is a diagram that shows the moving locus of the external teeth 34 of the flexible externally toothed gear 3 relative to the rigid internally toothed gear 2, which is obtained when the relative movement of the toothed gears 2, 3 of the wave gear device 1 is approximated with a rack. In this diagram, the x axis represents the direction in which the rack moves, and the y axis represents a direction perpendicular thereto. The moving locus of the external teeth 34 of the flexible externally toothed gear 3 is given by the following formula.

$$x = 0.5\,mn\,(\theta - \kappa \sin \theta) \quad (1)$$

$$y = \kappa mn \cos \theta$$

where 2n (n being a positive integer) denotes the difference in the number of teeth between the rigid internally toothed gear 2 and the flexible externally toothed gear 3, and $2\kappa mn$ ($\kappa$ being the deflection coefficient, a real number including 1, and m being a module) denotes the total amplitude of the moving locus of an arbitrary cross section of the flexible externally toothed gear relative to the rigid internally toothed gear.

To simplify the description, when m=1 and n=1 (the difference in the number of teeth being 2), the moving locus is as follows.

$$x = 0.5\,(\theta - \kappa \sin \theta) \quad (1A)$$

$$y = \kappa \cos \theta$$

The origin of the y axis in FIG. 3 is the average position of the amplitude of the moving locus. Among the moving loci, a normal-deflection moving locus M1 is obtained during a normal deflection state in which there is no deflection and the deflection coefficient $\kappa$ is 1, a positive-deflection moving locus M2 is obtained during a deflection state in which there is positive deflection and the deflection coefficient $\kappa$ is greater than 1, and a negative-deflection moving locus M3 is obtained during a deflection state in which there is negative deflection and the deflection coefficient $\kappa$ is less than 1. In this example, the amount of deflection is set in the principal section (a plane of rotation chosen in a predetermined position of the external teeth 34 of the flexible externally toothed gear 3 in the tooth trace direction), which is the basis of the tooth profile shape of the toothed gears 2, 3, so that a normal-deflection moving locus is obtained in which the deflection coefficient $\kappa$ is 1.

For example, the principal section is designed as shown in FIG. 2(a) as a principal section 30 in a position shown by the straight line passing through the centers of the balls of the bearing of the wave generator 4. In this case, $\kappa > 1$ pertains to a moving locus in a cross section from the principal section 30 to the external teeth front end part 34a, and $\kappa < 1$ pertains to a moving locus in a cross section from the principal section 30 to the external teeth rear end part 34b close to the diaphragm.

(Method of Forming Tooth Profile in Principal Section)

Figure 4:
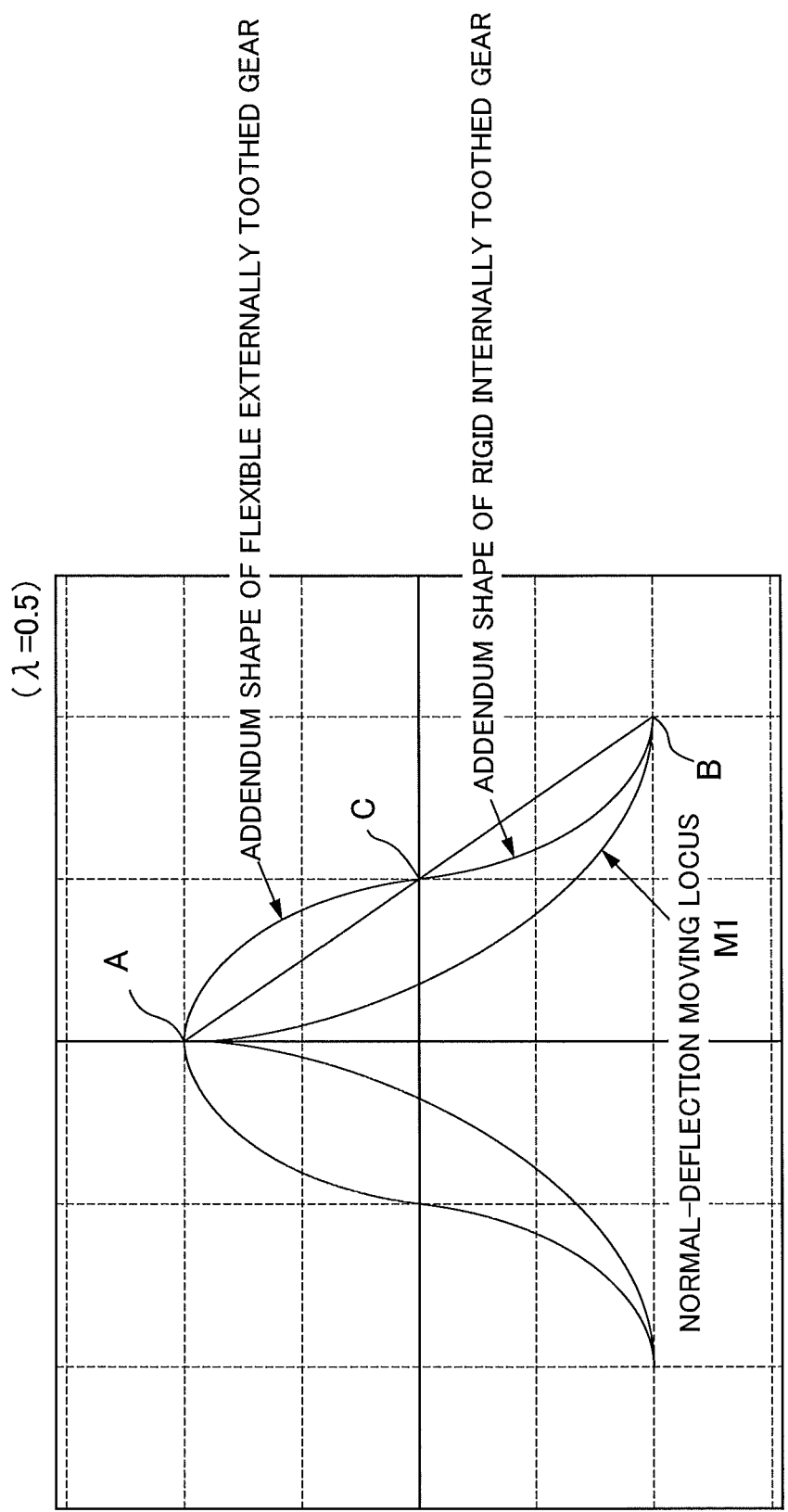
FIG. 4 is a descriptive diagram that shows the fundamental shapes of the addenda of the gears, which are obtained by the moving locus of the principal section of the tooth profile.

FIG. 4 is a descriptive diagram that shows the range of use that is set in the normal-deflection moving locus M1 of the teeth in the principal section 30. In this diagram, the parameter $\theta$ of the normal-deflection moving locus M1 of the principal section 30 has a range from $\pi$ (point B: the bottom of the moving locus) to 0 (point A: the peak of the moving locus), and this locus M1 is similarly transformed by $\lambda$ ($\lambda < 1$) using point B as a similarity center, resulting in a first similar curve BC. This first similar curve BC is used as a tooth profile curve for defining the fundamental addendum shape of the rigid internally toothed gear 2.

Using the end point C ($\theta = 0$) of the first similar curve BC as the center of the similarity transformation, the first similar curve BC is rotated 180 degrees, and the resulting curve is multiplied by $(1-\lambda)/\lambda$ using the end point C as a similarity center, resulting in a second similar curve AC. This second similar curve AC is used as the fundamental shape of the addenda of the flexible externally toothed gear 3.

FIG. 4 shows a case in which $\lambda = 0.5$. Expressed as formulas, the common addendum shapes of the toothed gears are as follows.

Fundamental formula of addendum shape of rigid internally toothed gear:

$$x_{ca} = 0.5\{(1-\lambda)\pi + \lambda(\theta - \sin \theta)\}$$

$$y_{ca} = \lambda(1 + \cos \theta) - 1\,(0 \leq \theta \leq \pi) \quad (2)$$

Fundamental formula of addendum shape of flexible externally toothed gear:

$$x_{Fa} = 0.5(1-\lambda)(\pi - \theta + \sin \theta)$$

$$y_{Fa} = \lambda(1 + \cos \theta) - \cos \theta\,(0 \leq \theta \leq \pi) \quad (3)$$

The meshing engagement of the tooth profile of the principal section 30 is the meshing engagement between the addendum shapes of the gears 2, 3, and when the flexible externally toothed gear 3 moves along the normal-deflection moving locus M1 relative to the rigid internally toothed gear 2, the teeth tip profiles are continuously in contact with each other because of the properties of the similar curve.

The dedendum shapes are not involved in the meshing engagement. Therefore, the dedendum shapes of the gears can be designed freely so long as they do not interfere with each other.

Figure 5:
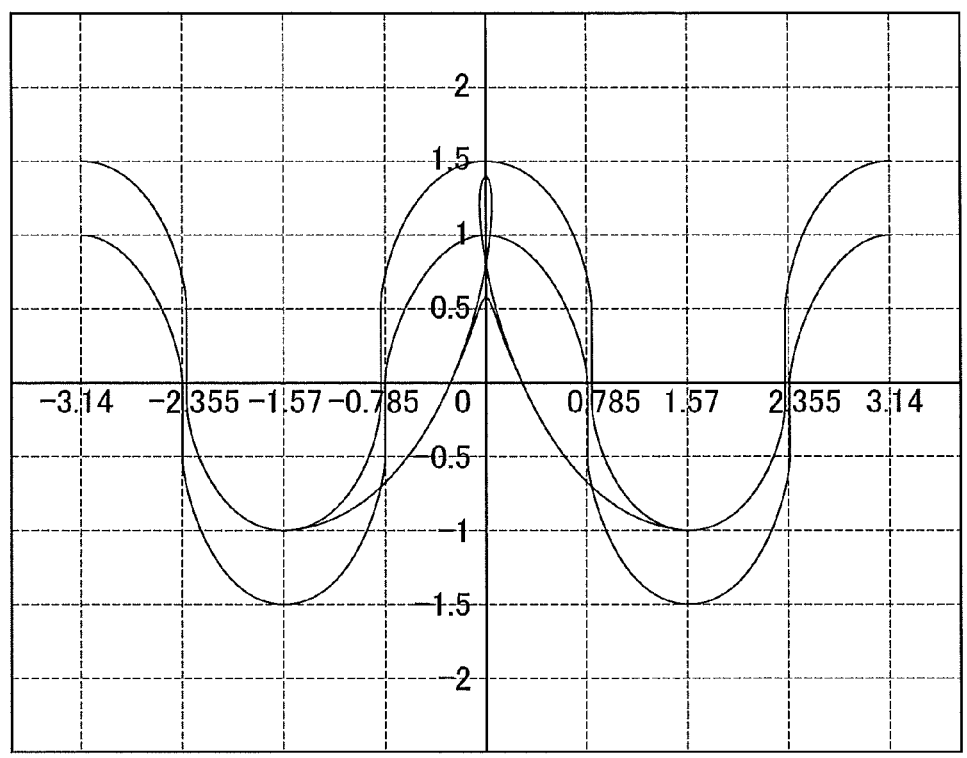
FIG. 5 is a descriptive diagram that shows an example of the gears according to the present invention.

FIG. 5 shows an example of the overall teeth profiles of the gears 2, 3. In this case, the portion of the addendum shape where the pressure angle is close to 0 degrees is preferably avoided in the consideration of gear machining. Therefore, it is preferable that the tooth profile becomes linear at the point where the pressure angle is close to 6 degrees, leading into the dedendum shape. For the sake of simplicity, the diagram shows a case in which the pressure angle is 0 degrees.

(Method of Forming Tooth Profile in Position other than Principal Section)

Figure 6:
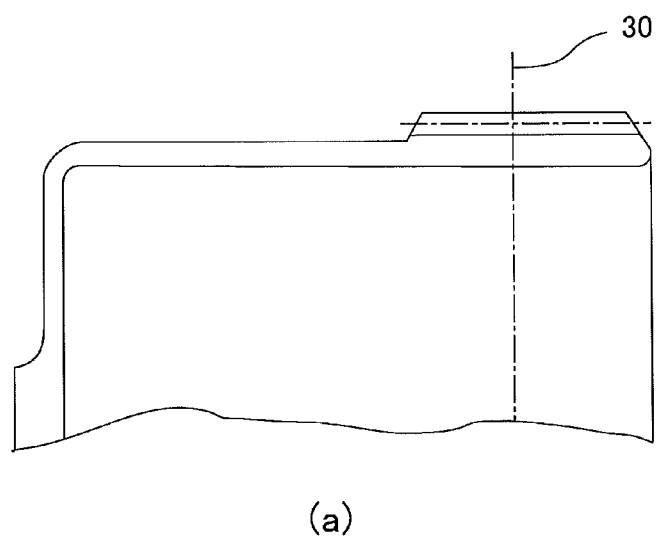
FIG. 6 is (a) a descriptive diagram that shows the axial shape of a tooth of the flexible externally toothed gear, wherein the tooth profile through the entire tooth trace direction is defined by the fundamental addendum shape obtained in the principal section, and (b) a descriptive diagram that shows the shape of a tooth that has been shifted according to the present invention.
Figure 6:
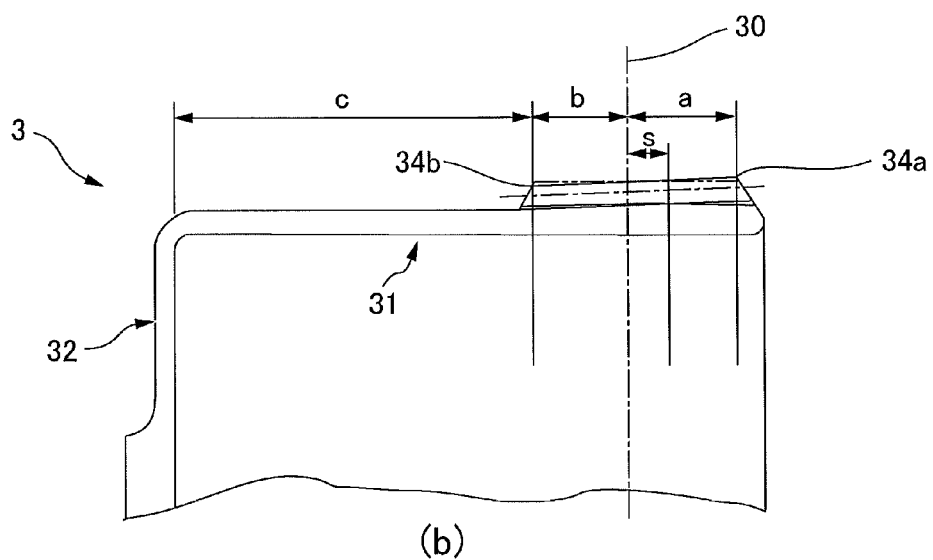

A method of forming a tooth profile of a plane of rotation other than the principal section 30 is described with reference to FIG. 6. First, the tooth profile through the entire tooth trace direction of the external teeth is made to be the same tooth profile as that of the principal section 30, as shown in FIG. 6(a). The shifted tooth profile is then determined, which is the aforementioned tooth profile shifted as designed in the following manner according to the tooth trace position. This shifted tooth profile is used as the tooth profile other than the principal section 30.

Specifically, in FIG. 6(b), a denotes the distance from the principal section 30 to the external teeth front end part 34a, b denotes the distance from the principal section 30 to the external teeth rear end part 34b at the diaphragm side, and c denotes the distance from the external teeth rear end part 34b to the diaphragm 32. The amount of deflection in the flexible externally toothed gear 3 has sufficient linearity in its cylinder generatrix when the neutral cylinder surface of the cylindrical barrel 31 has been deformed into an ellipsoidal shape by inserting the wave generator 4, and the amount of deflection is therefore substantially in proportion to the distance from the diaphragm to the opening along the major axis. When the deflection coefficient κ of the principal section 30 is 1 and s is used as a distance from the principal section 30 in each of the planes of rotation of the external teeth from the principal section 30 to the external teeth front end part 34a close to the opening, then the deflection coefficient of each of the planes of rotation is as follows:

$$\kappa=(s+b+c)/(b+c)$$

The deflection coefficient of each of the planes of rotation from the principal section 30 to the external teeth rear end 34b close to the diaphragm is as follows, with s being the distance from the principal section 30:

$$\kappa=(-s+b+c)/(b+c)$$

Because of the above matters, in each plane of rotation of the external teeth 34 from the principal section 30 to the opening 31a, the tooth profile has a deflection coefficient κ greater than 1 due to the coning of the flexible externally toothed gear 3. The peak of the positive-deflection moving locus M2 represents a meshing engagement having positive deflection which inscribes a loop, as shown in FIG. 3. Therefore, it interferes with the tooth profile established in the principal section 30, and it has been impossible to maintain a meshing engagement such as that of the principal section 30. In each plane of rotation of the external teeth from the principal section 30 to the diaphragm, the deflection coefficient κ is greater than 1, the negative-deflection moving locus M3 interferes with the normal-deflection moving locus M1, and it has been impossible to maintain a meshing engagement such as that of the principal section 30 in this case as well.

Thus, the external teeth 34 are shifted as described hereinbelow, and an attempt is made to ensure even a partial yet normal meshing engagement, although approximate, in all of the external teeth sections from the principal section 30 to the external teeth front end part 34a close to the opening and also to the external teeth rear end part 34b close to the diaphragm.

Specifically, in both a section of the external teeth 34 from the principal section 30 to the external teeth front end part 34a close to the opening and a section of the external teeth from the principal section 30 to the external teeth rear end part 34b close to the diaphragm, the shifted amount mnh is set according to the deflection coefficient κ of the deflection in each section so that the moving loci M2 and M3 in each section are tangent with the bottom part of the normal-deflection moving locus M1. The shifted amount when m and n are both 1 is h, which is expressed by the following formula.

$$h=\kappa-1 \qquad (4)$$

h may be a positive or negative value, h being positive in each of the planes of rotation from the principal section 30 to the external teeth front end part 34a close to the opening, and h being negative in each of the planes of rotation from the principal section 30 to the external teeth rear end part 34b close to the diaphragm.

Figure 7:
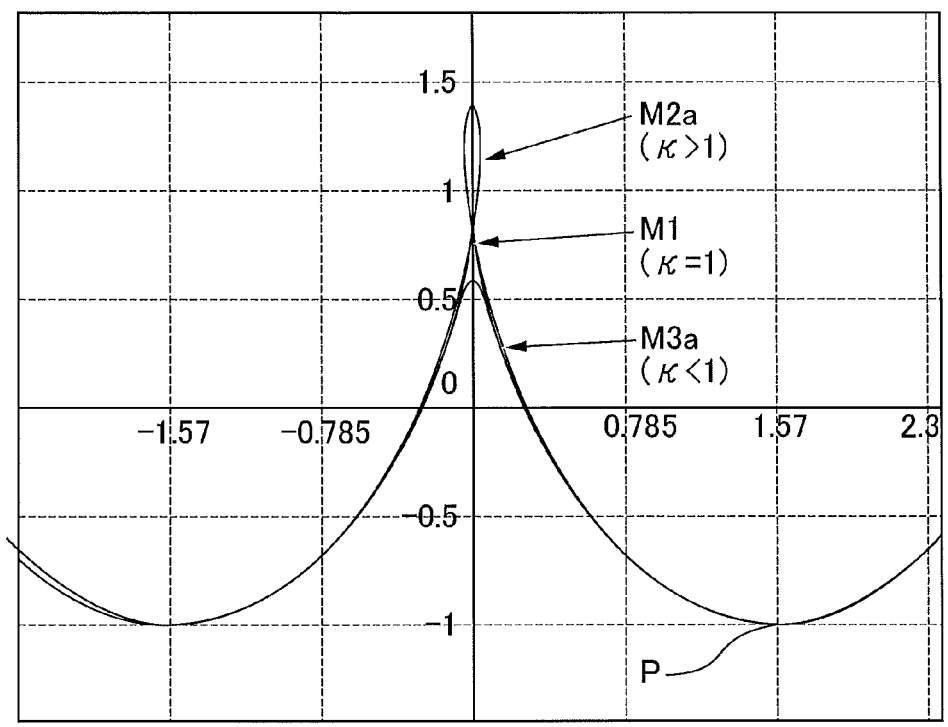
FIG. 7 is a descriptive diagram that shows three moving loci in the principal section, in the open end side section and in the diaphragm side section, respectively, of the shifted tooth profile shown in FIG. 6(b)

Next, FIG. 7 shows three moving loci M1, M2a, and M3a, which are respectively in the principal section 30, in the open end side section and in the diaphragm end side section of the external teeth 34 that have been shifted in this manner. These moving loci M2a and M3a contact the normal-deflection moving locus M1 of the principal section 30 at the bottom (point P), and the loci are very similar except for part of the peak. This shows that it is possible for the tooth profiles of the present invention derived from the moving loci to be able to mesh through the entire tooth trace direction, except in part of the peak.

Figure 8A:
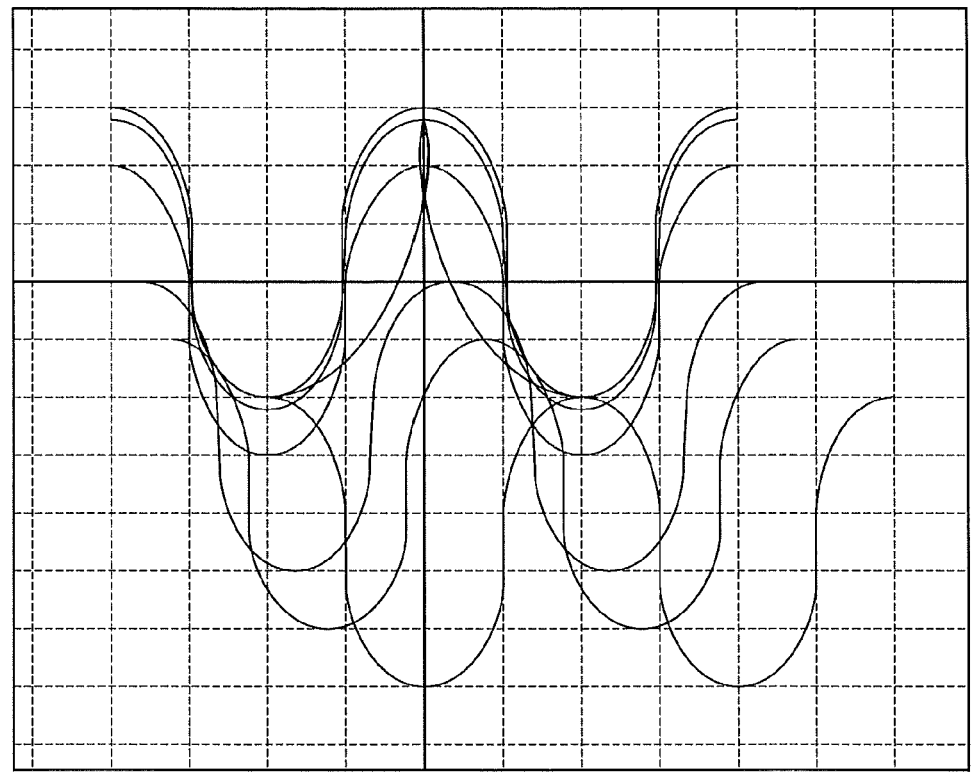
FIG. 8A is a descriptive diagram that shows the meshing engagement phases of the tooth profile shifted according to the present invention in the plane of rotation of the external teeth front end part at the opening side.
Figure 8B:
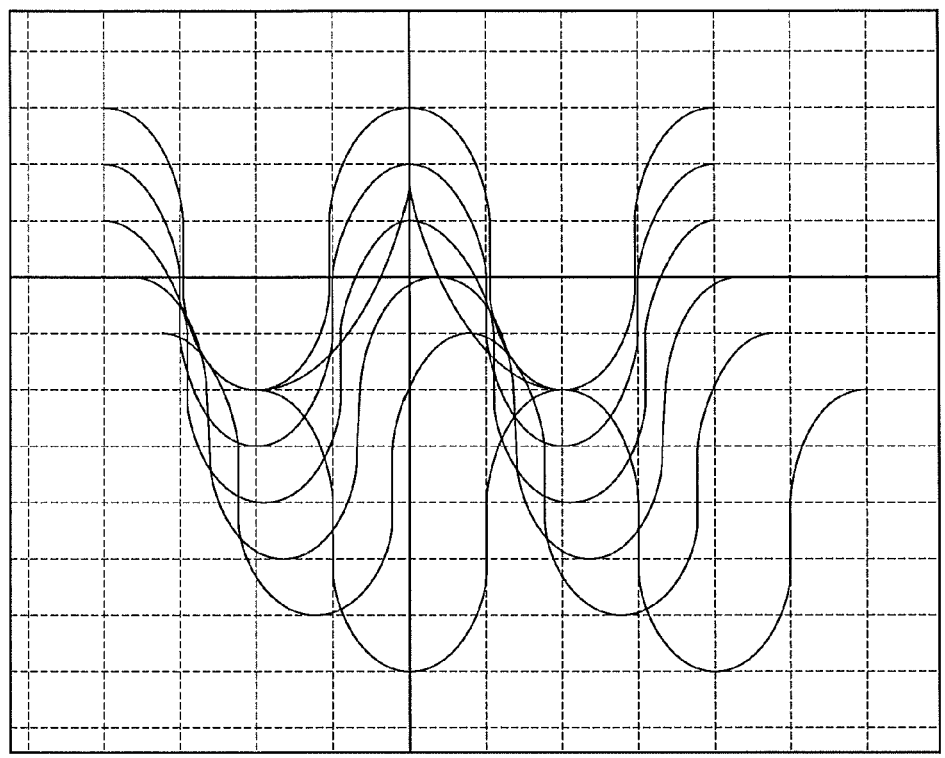
FIG. 8B is a descriptive diagram that shows the meshing engagement phases in the principal section of the tooth profile shifted according to the present invention.
Figure 8C:
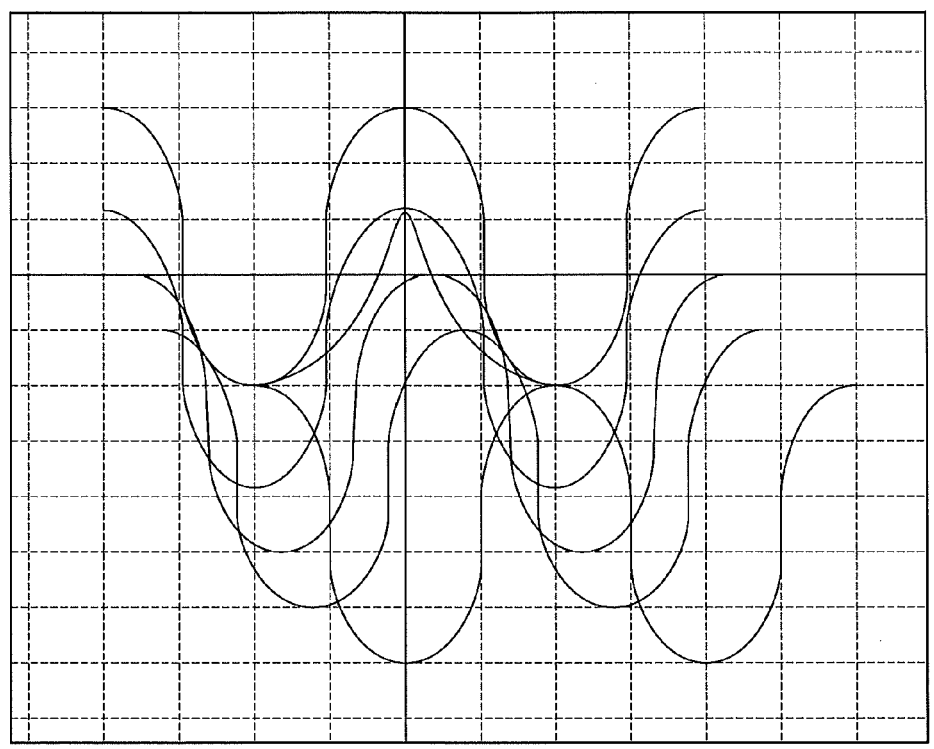
FIG. 8C is a descriptive diagram that shows the meshing engagement phases in the external teeth rear end part at the diaphragm side of the tooth profile shifted according to the present invention.

FIGS. 8A to 8C show rack approximations of the meshing engagement phases of the tooth profile in each plane of rotation of the tooth profile of the present example. FIG. 8A is a descriptive diagram that shows the meshing engagement phases in the plane of rotation of the external teeth front end part 34a close to the opening, FIG. 8B is a descriptive diagram that shows the meshing engagement phases in the principal section 30, and FIG. 8C is a descriptive diagram that shows the meshing engagement phases in the external teeth rear end part 34b close to the diaphragm. The moving loci of the tooth profile in each section correspond closely in the portions of the moving loci that reach the bottom, demonstrating the possibility of a meshing engagement through the entire tooth trace direction of the tooth profile of the present example.

The invention claimed is:

1. A wave gear device comprising a circular rigid internally toothed gear, a flexible externally toothed gear disposed coaxially inside the internally toothed gear, and a wave generator fitted inside the externally toothed gear;
wherein:
the flexible externally toothed gear has a flexible cylindrical barrel, a diaphragm extending in a radial direction from a rear end of the cylindrical barrel, and external teeth formed in an external peripheral surface portion close to a front end opening of the cylindrical barrel;
the flexible externally toothed gear is deflected into an ellipsoidal shape by the wave generator and meshed with the rigid internally toothed gear at both ends of the ellipsoidal shape in a major axis direction;
the amount of deflection in the external teeth of the flexible externally toothed gear deflected into the ellipsoidal shape increases from a side near the diaphragm toward a front end opening along a tooth trace direction, so that it increases substantially in proportion to a distance from the diaphragm;

a plane of rotation at a desired position in the tooth trace direction of the flexible externally toothed gear is established as a principal section and both the rigid internally toothed gear and the flexible externally toothed gear in the principal section are spur gears having a module m;

a number of teeth of the flexible externally toothed gear is set to be fewer than a number of teeth of the rigid internally toothed gear by 2n (n being a positive integer);

in a major axis position in an ellipsoidal rim neutral line of the flexible externally toothed gear in the principal section, an amount of deflection 2 κmn (where κ is the deflection coefficient) relative to a rim neutral circle before deflection is set so as to deflect in a normal-deflection state of 2 mn (κ=1);

in a tooth profile of the flexible externally toothed gear, the tooth profile portions to either side of the principal section in the tooth trace direction are shifted;

the meshing engagement of the flexible externally toothed gear and the rigid internally toothed gear is approximated with a rack meshing engagement, and each of moving loci of the teeth of the flexible externally toothed gear relative to the teeth of the rigid internally toothed gear accompanying rotation of the wave generator is determined in a plane of rotation at each of the positions including the principal section in the tooth trace direction of the flexible externally toothed gear;

in a normal-deflection moving locus obtained in the principal section, a curve portion running from point A at a peak to a next point B at a bottom is scaled down λ times (λ<1) using point B as a similarity center to obtain a first similar curve BC, and the first similar curve is used as a fundamental shape of an addendum of the rigid internally toothed gear;

a curve obtained by rotating the first similar curve BC 180 degrees about an endpoint C of the first similar curve BC is scaled down (1−λ)/λ times using the endpoint C as a similarity center to obtain a second similar curve, and the second similar curve is used as a fundamental shape of an addendum of the flexible externally toothed gear; and a shifted amount in the tooth trace direction in the tooth profile of the flexible externally toothed gear is set so that curves tangent at the bottom of the normal-deflection moving locus in the principal section are inscribed both by each of the negative-deflection side moving loci obtained in each of the planes of rotation to deflect in a negative deflection state (deflection coefficient: κ<1) closer to the diaphragm side than the principal section, and each of the positive-deflection side moving loci obtained in each of the planes of rotation to deflect in a positive deflection state (deflection coefficient: κ>1) closer to the front end opening side than the principal section.

2. The wave gear device of claim 1, wherein a denotes a distance in the tooth trace direction from the position of the principal section in the external teeth to a front end of the external teeth close to the front end opening;

b denotes a distance in the tooth trace direction from the position of the principal section in the external teeth to a rear end of the external teeth close to the diaphragm;

c denotes a distance from the rear end of the external teeth to the diaphragm; and s denotes a distance from the principal section, the deflection coefficient κ of each of the planes of rotation to deflect in the positive deflection state in the external teeth is defined by the following formula:

$$\kappa = (s+b+c)/(b+c); \text{ and}$$

the deflection coefficient κ of each of the planes of rotation to deflect in the negative deflection state in the external teeth is defined by the following formula:

$$\kappa = (-s+b+c)/(b+c); \text{ and}$$

an amount of shift in the external teeth is hmn, where h is defined by the following formula:

$$h = \kappa - 1$$

* * * * *